May 23, 1933. A. REDLER 1,910,056
CONVEYER
Filed May 20, 1929 3 Sheets-Sheet 1

INVENTOR
ARNOLD REDLER
BY
Toulmin & Toulmin
ATTORNEYS

May 23, 1933.  A. REDLER  1,910,056
CONVEYER
Filed May 20, 1929  3 Sheets-Sheet 2

INVENTOR
ARNOLD REDLER,
Toulmin + Toulmin
ATTORNEYS

May 23, 1933.  A. REDLER  1,910,056
CONVEYER
Filed May 20, 1929   3 Sheets-Sheet 3

INVENTOR
ARNOLD REDLER,
BY
Toulmin + Toulmin
ATTORNEYS

Patented May 23, 1933

1,910,056

UNITED STATES PATENT OFFICE

ARNOLD REDLER, OF SHARPNESS DOCKS, ENGLAND, ASSIGNOR TO REDLER CONVEYOR COMPANY, OF QUINCY, MASSACHUSETTS, A CORPORATION OF MASSACHUSETTS

CONVEYER

Application filed May 20, 1929, Serial No 364,361, and in Great Britain June 21, 1928.

This invention relates to conveyers and more particularly to conveyers having conveyer chains moving in open or closed conduits for conveying comminuted materials in bulk.

The invention has for its object generally an improved construction for conveyers which is efficient, economical and readily manufactured.

More specifically, it is an object to provide an improved construction for conveyer chains for reducing wear whereby lighter and cheaper materials may be employed, and which also enables conveyers of greater length and having parts of less tensile strength than heretofore, to be used.

It is also an object to provide conveyers with conveyer chains of a skeleton character which are adapted to convey comminuted material in substantially any condition, for example, wet or dry, hot or cold of high or low degrees of subdivision with the employment of a relatively small amount of driving power.

It is a further object to provide a strong and rugged skeleton-like conveyer chain using relatively light constructional parts. To this end a conveyer chain is provided adapted to work in conduits comprising a flexible member which may be relatively strong, having associated therewith conveying devices that are preferably of lighter and weaker materials. Such flexible member may be a rope, cable, or link chain disposed to move either along or parallel with the axis of the conveyer conduit; the former may comprise either twisted or parallel strands lying in the same or different planes.

It is still a further object to provide a construction for conveyers which employs a conduit that is adapted to transport materials in substantially any direction, for example, vertically, horizontally, inclined or in a combination of such directions. To this end, the flexible member is arranged to be supported and traverse a desired circuit in conjunction with a conduit that may be either rigid or flexible, such member being either wholly or partially enclosed therein; the conveying devices themselves being secured to the flexible member in a non-slip manner and adapted to propel frictionally individual portions of the material being conveyed.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figure 1:
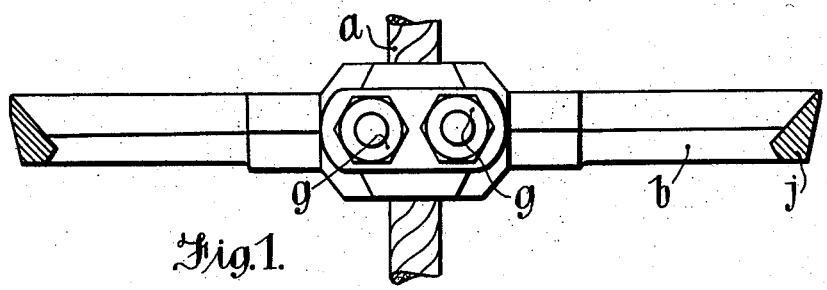
Fig. 1 is a fragmentary view partly in plan and partly in section showing a conveyer construction embodying the invention;
Figure 2:
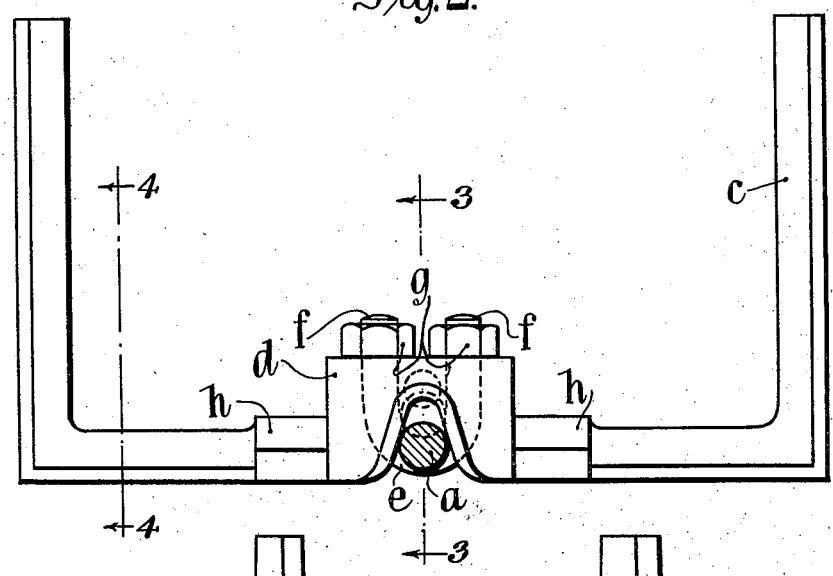
Fig. 2 is an elevational view of the device shown in Fig. 1.
Figure 3:
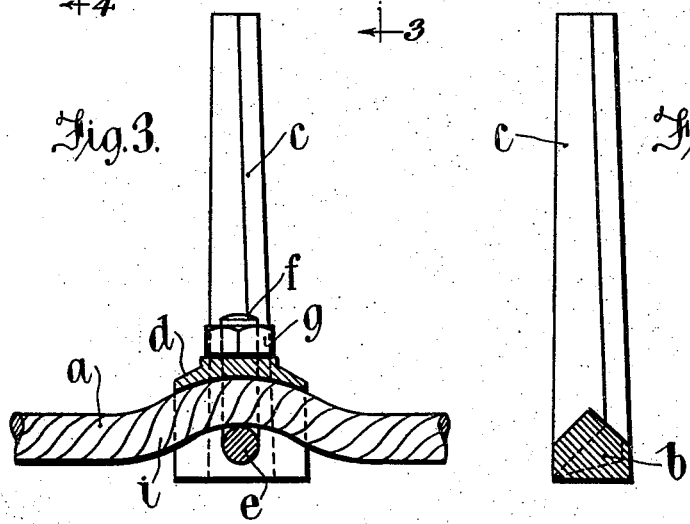
Fig. 3 is a sectional view taken on the line 3—3 in Fig. 2.
Figure 4:
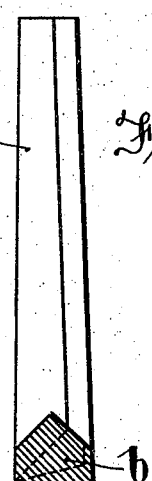
Fig. 4 is a sectional view taken on the line 4—4 in Fig. 2.

Referring now to the drawings and particularly to Figs. 1 to 4, a flexible member in the form of a cable is shown at $a$ provided with conveying devices in the form of crossbars or arm $b$. These arms are preferably bent to follow the wall of the conveyer conduit; accordingly they are shown as having bent-up ends at $c$, the arms being rigidly secured to the cable $a$. In accomplishing this latter, the arms are provided with a suitable engaging medial portion, such as member $d$ through which the cable is passed and made secure therein. The securing means associated with member $d$ may be of any suitable variety, adapted to grip the flexible member or cable in a non-slip manner, for example an eye or U-bolt having threaded ends $f$ which pass through the member and are engaged by exteriorly disposed nuts $g$. The cable thus engaged has a portion pressed into the member $d$ out of line, the rest of the cable thereby crimping the same and providing a firm grip between the member $d$ and the cable which does not slip. The portions of the arms $b$ immediately adjacent the member $d$ are preferably enlarged and shaped to form teeth to be engaged by sprockets or other means for driving or supporting the cable. Accordingly the arms $b$ are shown as having prismatic enlargements or teeth at $h$. In conveyers of the present invention, it is not necessary that all the arms be formed with such teeth since it is essential only that the arms having teeth be so spaced as to afford proper support and propulsion for the conveyer chain in passing over the sprockets. The bending or shaping of the arms $b$ is preferably such as to cause the arms to conform closely to the interior periphery of the walls of the conveyer conduit, which latter may be of substantially any desired shape in cross section, for example, circular, triangular, square, rectangular or polygonal. The arms $b$ themselves are preferably shaped to have sloping sides, which impart ridges to the arms about their interior portion at the junction of the sides. Such arms, in cross section, appear like a structure with sloping roof, as shown in Fig. 4. The upright portion of the arms $b$ in Fig. 1 have their ridge somewhat offset from the center line. The sloping sides enable the conveying devices here employed to apply the desired pressure for moving the material that is being transported in bulk since the slope of the sides to walls of the conveyer preferably is substantially that corresponding to the angle of repose for the material being transported.

Figure 9:
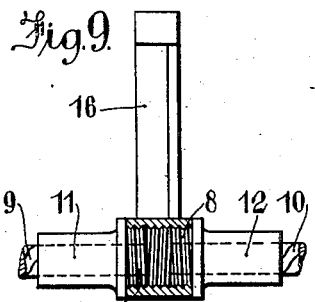
Figs. 9 and 10 are similar views showing a still further modified form of attachment;
Figure 10:
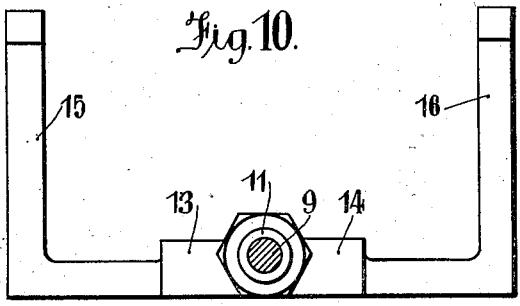
Figure 11:
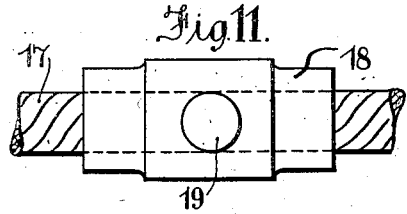
Figs. 11 and 12 are fragmentary views illustrating a still further modification in which the attached means comprise driving devices for use in the practice of the invention;
Figure 12:
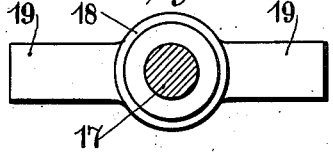
Figure 7:
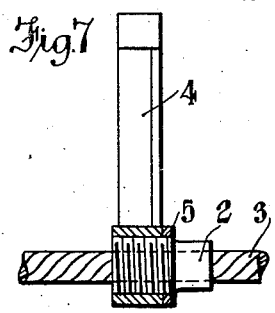
Figs. 7 and 8 illustrate respectively a fragmentary sectional view and front elevational view of a conveying device constructed in accordance with the invention employing a modified form of attachment to the flexible member.
Figure 8:
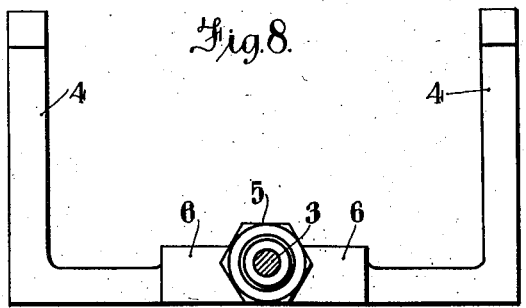

While the U-bolt securing means illustrated in Figs. 1 to 4 is a convenient, rugged and light form of such means, suitable for use with conveyer chains of the present invention, still other forms which are relatively rugged may be employed that do not crimp the cable. A suitable means of this character is illustrated in Figs. 7 and 8 where a ferrule 2 is swaged or otherwise made fast on a cable 3, the ferrule being threaded on the outside for engagement with a recessed portion 4 of a crossbar that is adapted to be screwed on the ferrule and held in place by a lock-nut 5. Such crossbar is also preferably provided with teeth, as shown at 6, for engagement with driving or idler sprockets.

Where there is a tendency of the cable to twist and otherwise require frequent readjustment of the conveying devices along the cable, a discontinuous rather than a continuous form of cable may be employed. Sections of cable may thus be employed which either completely avoid or substantially compensate for the relative twist in the portions of the cable. Figs. 9 and 10 illustrate this manner of employing sections of cable. Here, ends 7 and 8 of the cable sections 9 and 10 are respectively provided with ferrules 11 and 12 that are swaged or otherwise made fast to the cable. The crossbars are arranged to serve as the uniting means; accordingly the arms 15—16 have a socket adapted for screw-threaded engagement with the ferrules 11 and 12. The portions of the arms 13 and 14 adjacent the socket are arranged as before to provide teeth for driving the conveyer chain. Where it is desired to provide driving means, without providing conveying devices, the cable may be provided with ferrules engaging with sockets having sprocket engaging elements only, as shown in Figs. 11 and 12. Here, a cable 17 has a ferrule 18 secured thereon formed with lateral projections 19 serving as driving teeth for engagement with sprockets.

Figure 5:
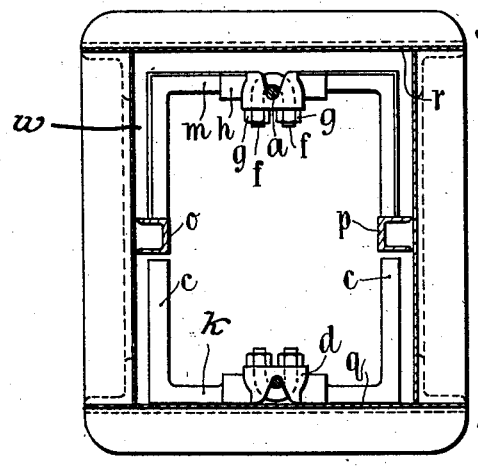
Fig. 5 is a view partly in section and partly in elevation, showing a conduit having disposed therein a conveying device of the character illustrated in Figs. 1 to 4.

The conveyer chain constructions here set forth, taking that shown in Figs 1 to 4, as a specific example, are adapted to be disposed in a desired circuit and work in a conveyer conduit either wholly or partially enclosed. Fig. 5 shows this type of conveyer chain having its forward and return runs disposed wholly within the conveyer conduit. Here $n$ denotes the conduit walls, the forward run being indicated at $k$, while the return run is indicated at $m$. To keep these runs in place and to prevent interference between the ends of the conveyer arms, guides $o$ and $p$ are provided on the interior walls between the ends of the arms $c$. The forward run here sweeps the bottom $q$, while the return run moves adjacent the top $r$ of the conduit.

In operation, it is seen that the conveyer chains are propelled or supported in their movement through the conveyer conduit by suitable sprockets (not shown in the interest of clearness) which cause the arms of the conveyer chain to sweep the conveyer walls and engage frictionally with the material being transported in bulk. Such chains thus operate to draw the material along with their motion like the drag of a stream. The conduits may, of course, have any suitable dimensions, but the conveyer chain just described is particularly adapted to work in a conduit 8 inches wide and two feet deep and may be arranged as shown in Fig. 5. The distance apart of the crossbars on the flexible member is preferably such as substantially to divide evenly the stress incurred when in engagement with the driving means. This spacing also affects the tendency of the flexible member to twist. Accordingly it is desired that the spacing of crossbars be such as to reduce the tendency to twist as far as possible.

Figure 6:
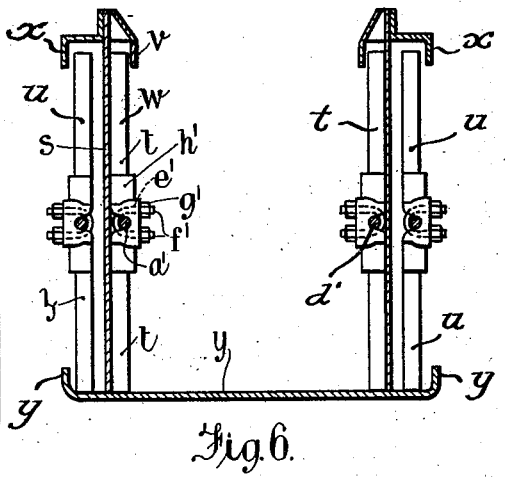
Fig. 6 is a view similar to Fig. 5 illustrating a modified form of the invention.

A modified form of conveyer is shown in Fig. 6 which differs from that shown in Fig. 5 in that the arms of the conveyer chain do not have up-turned ends, flat chains being here employed instead comprising oppositely disposed runs traveling in the same direction on conduit walls. Here the forward runs are shown at $t$ disposed on the inner side of wall $s$, the return runs being shown at $u$ on the outside of walls $s$. To keep these runs in place, the conduit has interior guides $v$ engaging with the upper portion of the arms on the interior of the conduit, and exterior guides $x$ and $y$ to engage respectively with the upper and lower arms $w$ and $z$ of the return runs $u$. These arms also have recessed members $d'$ for attachment to the cables $a'$; this being readily accomplished by U-bolts $e'$ which have threaded ends $f'$ engaged by nuts $g'$. The portions of the arms adjacent a member $d'$ are also shown as enlarged to provide teeth $h'$ for engagement with idler or driving sprockets.

The means here employed for securing cross arms to the driving cable may obviously be employed in connection with conveyer chains of other varieties, for example those shown in my prior Patents 1,433,567; 1,475,596; 1,697,963 and in my pending application, Serial No. 88,124, filed February 13, 1926.

Figure 13:
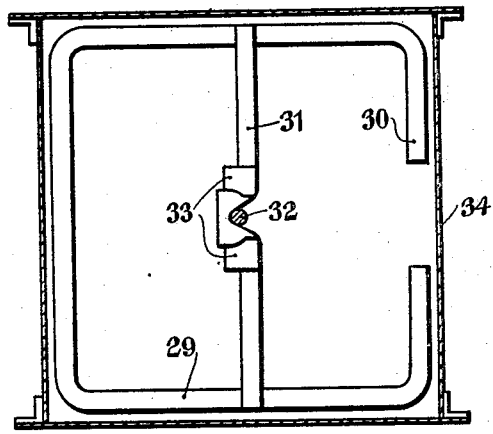
Figs. 13, 14 and 15 illustrate cross sections of three different modifications of conveyers adapted to work in closed conduits, constructed in accordance with the invention; and Figure 14:
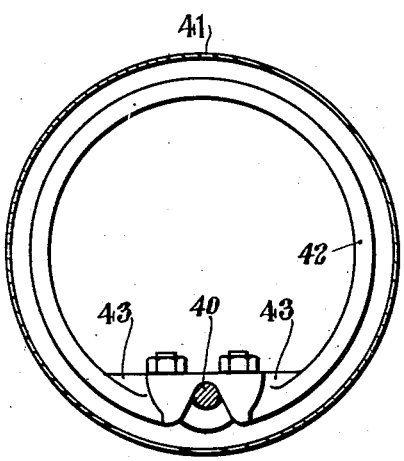
Figure 15:
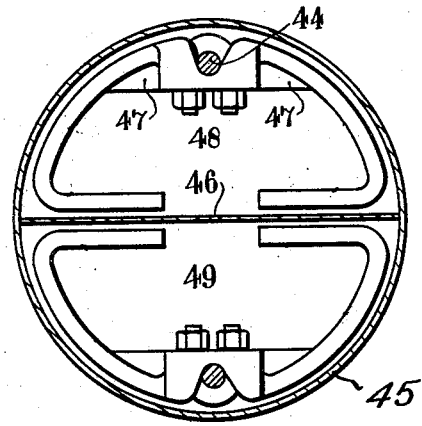

In Figs. 13, 14, and 15, conveyer conduits which are rectangular and circular in cross section are shown which have modified forms of conveyer arms provided with engaging medial portions in accordance with the invention. In Fig. 13, the conveyer conduit is shown at 34 and houses a driving cable 32 disposed to travel along an axis of the conduit, this cable having conveyer devices secured thereto comprising crossbars 29 supported by arms 31 which have a recess portion engaging with the cable 32, the arms having driving teeth 33. The crossbars follow generally the interior periphery of the conduit and may be discontinuous if desired as indicated at 30.

Where the conduit is circular in cross section, the driving cable may be disposed at one side instead of centrally. This is shown in Fig. 14 where a cable 39 travels parallel to the axis of a conduit 41 and is provided with crossbars 38 of a circular contour secured to the cable in the non-slip manner, and provided with driving teeth 40.

The conduit shown in Fig. 14 is, of course, a one-way conduit, but such conduits may be readily adapted to receive forward and return runs of a skeleton-chain of the present invention. An arrangement of this character is illustrated in Fig. 15, where a partition 46 divides the conduit 45 into two parts, as shown at 48 and 49, in each of which moves a conveyer run comprising a driving cable, as indicated at 44, the crossbars of which have driving teeth as shown at 47.

Figure 16:
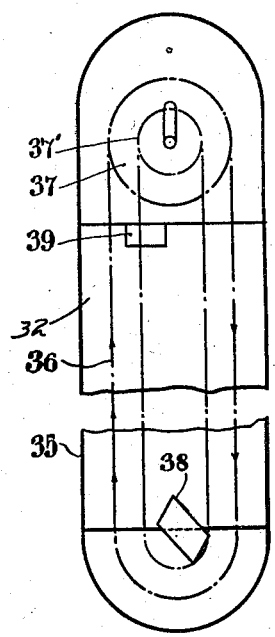
Fig. 16 is a side elevation of another form of complete conveyer constructed in accordance with the invention, certain parts being broken away and other parts being indicated conventionally.

Conveyer chains of the present invention may also be supported in substantially any desired manner in the conveyer conduit as pointed out above, for example by means of one or more driving sprockets. An arrangement using but a single sprocket is shown in Fig. 16, where 35 denotes a conduit in which a cable 36 is disposed over a driving sprocket 37. This conduit has an inlet 38, an outlet 39 and means for adjusting the position of the driving sprocket with reference to the conduit, of any suitable character, for example, a movable shaft working in slots formed in the sides of the upper end of the conveyer casing, the position of which is secured by means of a tensioning wheel 37'.

While the conveyers of the present invention are normally adapted to work with conduits that have inlets and outlets through which the material being transported is received and discharged, the transport of such material being effected by the forward run of the conveyer chain, still it is contemplated in some instances to employ both the forward and return runs simultaneously in the transport of materials, for example the forward run may be employed for conveying granular material in bulk, while the return run may be employed for transporting packages, food-sacks and the like.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a conveyer, the combination with a flexible member adapted to travel in a conduit and arranged to engage co-operatively with guiding sprockets, of transversely-disposed conveyer members each provided with an engaging medial portion rigidly attached thereto at predetermined points, said members having arms extending about and conforming in shape with the sides of the conduit, the inside edges of said arms terminating in inclined sides which intersect and provide a relatively sharp conveyer edge.

2. In a conveyer, the combination with a flexible member adapted to travel in a conduit and arranged to engage co-operatively with guiding sprockets, of transversely-disposed conveyer members each provided with an engaging medial portion formed with a recess, and means for effecting non-slip engagement between said flexible member and the wall of said recess whereby said conveyer members are rigidly attached to said flexible member at predetermined points, said conveyer member having arms extending about and closely conforming with the sides of said conduit, the inside edges of said arms terminating in inclined sides which intersect and provide a relatively sharp conveyer edge.

3. In a conveyer, the combination with a flexible member adapted to travel in a conduit and arranged to engage co-operatively with guiding sprockets, of transversely-disposed conveyer members each provided with an engaging medial portion having a V-shaped opening therein, and a separable element associated therewith for effecting crimping engagement between said portion and said flexible member whereby said conveyer members are rigidly attached to said flexible member at predetermined points, said conveyer member having arms extending about and closely conforming with the sides of said conduit, the inside edges of said arms terminating in inclined sides having an inclination which is substantially that of the angle of repose for the material conveyed.

4. In a conveyer, the combination with a flexible member adapted to travel in a conduit and arranged to engage co-operatively with guiding sprockets, of transversely-disposed conveyer members each provided with an engaging medial portion rigidly attached at predetermined points to said flexible member and having teeth formed as enlargements adjacent said medial portions for engaging with said guiding sprockets and disposed symmetrically about the point of attachment to said flexible member.

5. In a conveyer, the combination with a flexible member adapted to travel in a conduit and arranged to engage co-operatively with guiding sprockets, of transversely-disposed conveyer members having teeth for engagement with said guiding sprockets, said conveyer members being rigidly attached to said flexible member and provided with arms shaped to conform closely with the sides of said conduit, the inside edges of which terminate in inclined sides which intersect and provide a relatively sharp conveyer edge.

6. In a conveyer, the combination with a flexible member adapted to travel in a conduit and arranged to engage co-operatively with guiding sprockets, of transversely-disposed conveyer members having teeth for engagement with said guiding sprockets, said conveyer members being rigidly attached to said flexible member and provided with arms shaped to conform closely with the sides of said conduit, the inside edges of which terminate in inclined sides which intersect and provide a relatively sharp conveyer edge, the inclination of said sides being substantially that of the angle of repose for the material conveyed.

7. A conveyer for conveying flowable solid material in bulk comprising a conduit having an inlet and an outlet, a flexible cable disposed within said conduit, a plurality of rigid transporting elements cooperating with the conduit to effect conveyance of the material in a continuous mass, said transporting elements being detachably connected to the flexible cable and being of open configuration whereby to permit the same to be drawn through the solid material without jamming when the conveyer outlet is closed.

8. A conveyer for conveying flowable solid material in bulk comprising a conduit having an inlet and an outlet, a flexible cable disposed within said conduit, a plurality of rigid transporting elements cooperating with the conduit to effect conveyance of the material in a continuous mass, said transporting element being adjustably secured to the cable to permit variation in the space between the same and being of open configuration whereby to permit the same to be drawn through the solid material without jamming when the conveyer outlet is closed.

9. A conveyer for conveying flowable solid material in bulk comprising a conduit having an inlet and an outlet, a flexible member disposed within and longitudinally of said conduit, a plurality of rigid transporting elements cooperating with the conduit to effect conveyance of the material in a continuous mass, said transporting elements being detachably connected to said flexible member and being of open configuration whereby to permit the same to be drawn through the solid material without jamming when the conveyer outlet is closed.

10. A conveyer for conveying flowable solid material in bulk comprising a conduit having an inlet and an outlet, a flexible member disposed within and longitudinally of said conduit, a plurality of rigid transporting elements cooperating with the conduit to effect conveyance of the material in a continuous mass, said transporting elements being provided with portions angularly arranged with respect to the conduit and being detachably connected to the flexible member to permit reversal thereof and being of open configuration whereby to permit the same to be drawn through the solid material without jamming when the conveyer outlet is closed.

11. A conveyer for conveying flowable solid material in bulk, comprising a conduit having an inlet and an outlet, a flexible member disposed within and longitudinally of said conduit, a plurality of rigid transporting elements of open configuration reversibly mounted upon said flexible member in spaced relation and cooperating with the conduit to effect conveyance of the material in a continuous mass.

12. A conveyer for conveying flowable solid material in bulk comprising a conduit having an inlet and an outlet, a flexible cable disposed within said conduit, a plurality of rigid transporting elements cooperating with the conduit to effect conveyance of the material in a continuous mass, said transporting elements being connected to the flexible cable and being of open configuration whereby to permit the same to be drawn through the solid material without jamming when the conveyer outlet is closed.

In testimony whereof I affix my signature.

ARNOLD REDLER.